US007979178B2

(12) United States Patent
Bertosa et al.

(10) Patent No.: US 7,979,178 B2
(45) Date of Patent: Jul. 12, 2011

(54) METHOD OF FLASH PROGRAMMING SCAN TOOLS AND PASS THRU DEVICES OVER WIRELESS COMMUNICATIONS

(75) Inventors: Thomas Bertosa, Chardon, OH (US); Michael Gessner, Akron, OH (US); Matthew Koran, Medina, OH (US)

(73) Assignee: SPX Corporation, Charlotte, NC (US)

( * ) Notice: Subject to any disclaimer, the term of this patent is extended or adjusted under 35 U.S.C. 154(b) by 1043 days.

(21) Appl. No.: 11/790,746

(22) Filed: Apr. 27, 2007

(65) Prior Publication Data

US 2008/0269975 A1 Oct. 30, 2008

(51) Int. Cl.
*G06F 19/00* (2006.01)

(52) U.S. Cl. ............. 701/33; 701/29; 340/438; 702/182

(58) Field of Classification Search .............. 701/29–36; 702/182–184; 340/438
See application file for complete search history.

(56) References Cited

U.S. PATENT DOCUMENTS 7,272,475 B2 * 9/2007 Gawlik et al. .................. 701/29

* cited by examiner

*Primary Examiner* — Yonel Beaulieu
(74) *Attorney, Agent, or Firm* — Baker & Hostetler LLP

(57) ABSTRACT

A diagnostic tool and method are provided wherein the diagnostic tool includes a wireless communication circuit to retrieve diagnostic software from a remote computing device. When operated, the scan tool can determine if the loaded diagnostic software is appropriate for the vehicle under test. If not, the diagnostic tool can retrieve the appropriate diagnostic software from the remote computing device. The retrieved or second diagnostic software is then operated to reprogram the diagnostic tool to remove the previously loaded software and allow a user to service a vehicle.

16 Claims, 3 Drawing Sheets

METHOD OF FLASH PROGRAMMING SCAN TOOLS AND PASS THRU DEVICES OVER WIRELESS COMMUNICATIONS

FIELD OF THE INVENTION

The present invention relates generally to an automotive diagnostic tool. More particularly, the present invention relates to a method of FLASH programming an automotive diagnostic tool and pass through devices over wireless communication connection.

BACKGROUND OF THE INVENTION

Modern vehicles typically have one or more diagnostic systems, generally having separate computer control modules to control various functions of the vehicle. Some examples include a powertrain control module (PCM), an engine control module (ECM), a transmission control module (TCM), an anti-locking brake system (ABS), and an air bag control module. The vehicle diagnostic systems often have self-diagnostic capabilities to detect and alert the driver of problems that the vehicle may be encountering. When a problem is found, a diagnostic trouble code (DTC), is set within the computer's memory. DTCs are as general or as specific as the manufacturer desires.

To retrieve and decipher DTCs, an auto repair technician needs a diagnostic tool, such as a scan tool. The scan tool is connected to the vehicle's computer bus system via a data link connector (DLC) to access and retrieve the DTCs. Scan tools are testing devices that interface with vehicle diagnostic systems to retrieve information from the various control modules. Scan tools are equipped to communicate in various communication protocols such as Controller Area Network (CAN), J1850 VPM and PWM, ISO 9141, Keyword 2000 and others. These communication protocols may be specific to each of the various vehicle manufacturers. The scan tool will help the technician to diagnose and repair the vehicle based on the information the tool retrieves from the vehicle.

The scan tools include computer software which must be periodically updated depending on the make and model of the vehicle to be serviced. In addition, the scan tool computer software may need to be updated from time to time as improvements in the software are made. Presently, many scan tools are FLASH programmed over a wired communication connection. FLASH programming a scan tool over wired communication connections is cumbersome because a user is required to bring the scan tool to a personal computer, and physically connect the scan tool to the personal computer.

A scan tool is physically connected to a personal computer with a cable. Cables vary in length depending on the particular application, but their maximum lengths are limited by their internal resistances associated with the conductors in the cables. Presently, there are cables that can link a scan tool and a personal computer when the two devices are separated by twenty feet. These cables require maintenance as the insulation surrounding them can deteriorate depending on whether they are properly cared for. In addition, the conductor within the cable may be broken within the cable if the cable is put in a high traffic area when it is continuously stepped on or driven over by a vehicle. Finally, requiring that the scan tool be physically connected to the PC limits the range that a technician can be from the personal computer and still update the scan tool.

Accordingly, it is desirable to provide a method and apparatus that allows a scan tool to be FLASH programmed over a wireless communication connection in order to eliminate the need for a cable and to extend the distance that one can operate a scan tool from a personal computer.

SUMMARY OF THE INVENTION

The foregoing needs are met, to a great extent, by the present invention, wherein in one aspect an apparatus is provided that in some embodiments allows a diagnostic tool to be reprogrammed with another diagnostic software that is retrieved from a remote computing device.

In accordance with one embodiment of the present invention a diagnostic tool for diagnosing a vehicle that includes a processor, a memory that stores a first diagnostic software that operates the processor to perform a diagnostic function, a connector interface that connects the diagnostic tool to a data link connector in the vehicle, a signal translator that allows the diagnostic tool to communicate with the vehicle in at least one communication protocol, a wireless communication circuit that communicates with a remote computing device to retrieve a second diagnostic software that is different from the first diagnostic software, and a housing surrounding the processor, the memory, the connector interface, the signal translator, and the wireless communication circuit.

In accordance with another embodiment of the present invention, a method of operating a diagnostic tool for a vehicle includes connecting the diagnostic tool to the vehicle, determining whether a first diagnostic software operating on the diagnostic tool is appropriate for the vehicle, communicating wirelessly with a remote computing device to obtain a second diagnostic software if the first diagnostic software is determined to be inappropriate, retrieving the second diagnostic software from the remote computing device, storing the second diagnostic software in the diagnostic tool, and operating the second diagnostic software to diagnose the vehicle.

In accordance with yet another embodiment of the present invention, a diagnostic tool for a vehicle, comprises a means for processing that is operated by a software program, a means for storing that stores a first software that operates the means for processing to perform a diagnostic function, a means for connecting that connects the diagnostic tool to a data link connector in the vehicle, a means for translating that allows the diagnostic tool to communicate with the vehicle in at least one communication protocol, a means for wirelessly communicating that communicates with a remote computing device to retrieve a second diagnostic software that is different from the first diagnostic software, and a means for housing surrounding the means for processing, the means for storing, the means for connecting, the means for translating, and the means for wirelessly communicating.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
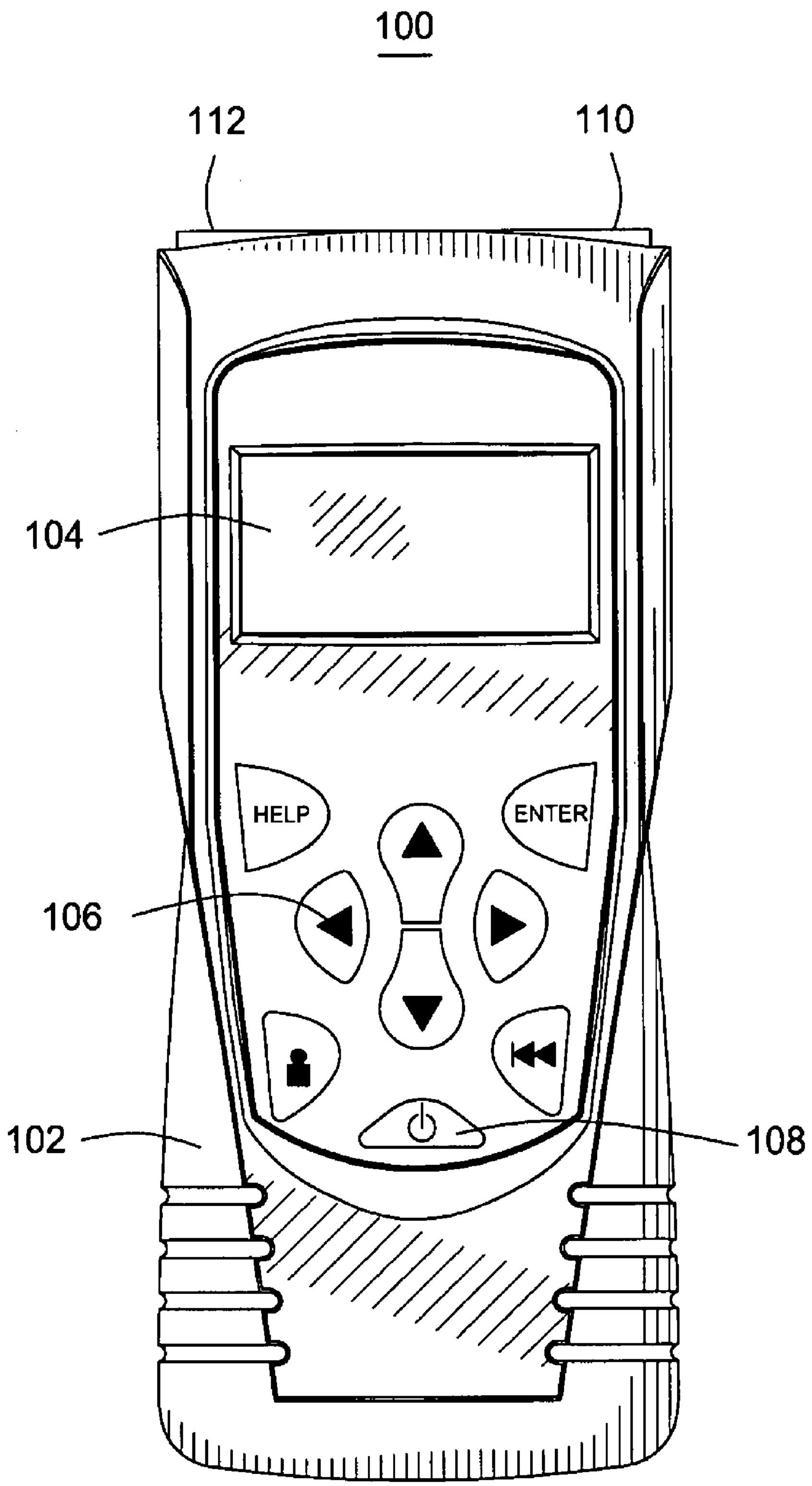
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus, such as a scan tool and method that allows a scan tool to be FLASH programmed over a wireless communication connection.

An embodiment of the present inventive apparatus is illustrated in FIG. 1. In particular, FIG. 1 is a front view illustrating a diagnostic tool 100 according to an embodiment of the invention. The diagnostic tool 100 can be any computing device, such as, for example, the Nemisys diagnostic tool from Service Solutions (a unit of the SPX Corporation) in Owatonna, Minn. or Elite Autoscanner® Pro CP9190 from Actron (a unit of Service Solutions). The diagnostic tool 100 includes a housing 102 to house the various components of the diagnostic tool, such as a display 104, a user interface 106, a power key 108, a memory card reader 110 (optional) and a connector interface 112. The display 104 can be any display, for example, a liquid crystal display (LCD), a video graphics array (VGA), a touch display (which can also be a user interface), etc. The user interface 106 allows the user to interact with the diagnostic tool in order to operate the diagnostic tool as desired. The user interface 106 can include function keys, arrow keys or any other type of keys that can manipulate the diagnostic tool 100 in order to operate various menus that are presented on the display. The input device 106 can also be a mouse or any other suitable input device, including a keypad, or a scanner. The user interface 106 can also include numbers or be alphanumeric. The power key 108 allows the user to turn the diagnostic tool 100 on and off, as required.

Memory card reader 110 can be a single type card reader, such as a compact flash card, floppy disc, memory stick, secure digital memory, flash memory or other types of memory. The memory card reader 110 can be a reader that reads more than one of the aforementioned memory such as a combination memory card reader. Additionally, the memory card reader 110 can also read any other computer readable medium, such as CD, DVD, UMD, etc.

The connector interface 112 allows the diagnostic tool 100 to connect to an external device, such as an ECU of a vehicle, a computing device, an external communication device (such as a modem), a network, etc. through a wired or wireless connection. Connector interface 112 can also include a USB, FIREWIRE, modem, RS232, RS485, and other connections to communicate with external devices, such as a hard drive, USB drive, CD player, DVD player, UMD player or other computer readable medium devices.

Figure 2:
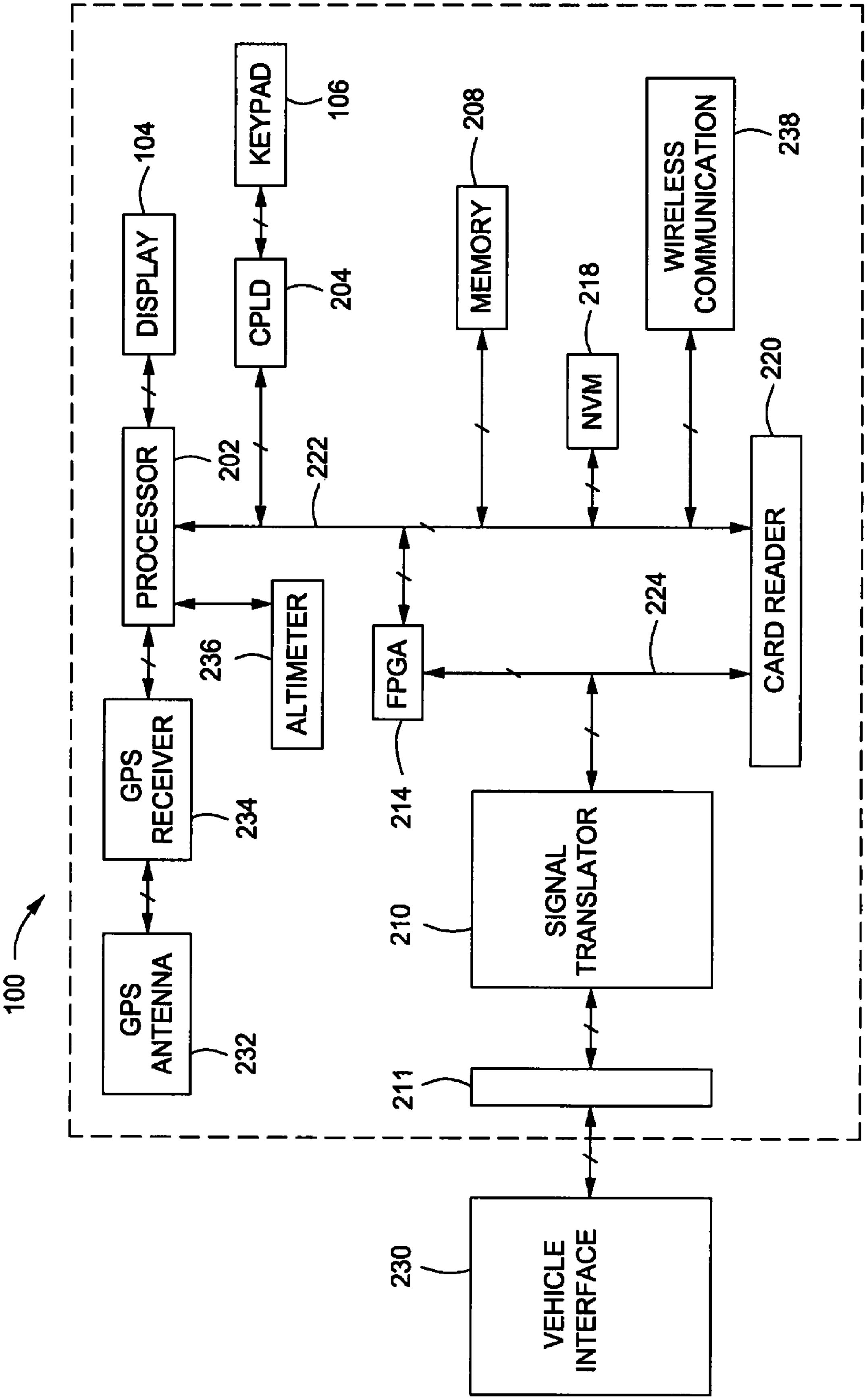
FIG. 2 is a block diagram of the components of a diagnostic tool according to an embodiment of the invention.

FIG. 2 is a block diagram of the components of the diagnostic tool 100. In FIG. 2, the diagnostic tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory (NVM) 218, a card reader 220, a second system bus 222, a connector interface 211, a selectable signal translator 210, a GPS antenna 232, a GPS receiver 234, an optional altimeter 236 and wireless communication circuit 238. A vehicle communication interface 230 is in communication with the diagnostic tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to connect diagnostic tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The database can include data for tuning or servicing a vehicle at various altitudes or regions. Because vehicles run differently (for example, oxygen levels vary at different altitudes) at different altitudes or regions, moving a vehicle (such as a racing vehicle) from one altitude to another or from one region (hot) to another region (cold) will require tuning the vehicle to that changed altitude and/or region as discussed below. The database can also be stored on an external memory, such as a compact flash card or other memories.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

The GPS antenna 232 and GPS receiver 234 may be mounted in or on the housing 102 or any combination thereof. The GPS antenna 232 electronically couples to the GPS receiver 234 and allows the GPS receiver to communicate (detects and decodes signals) with various satellites that orbit the Earth. The GPS receiver 234 electronically couples to the processor 202, which is coupled to memory 208, NVM 218 or a memory card in the card reader 220. The memory can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user.

The GPS receiver must communicate with and "lock on" to a certain number of satellites in order to have a "fix" on its global location. Once the location is fixed, the GPS receiver with the help of the processor can determine the exact location including longitude, latitude, altitude, velocity of movement and other navigational data.

Should GPS receiver be unable to lock onto the required number of satellites to determine the altitude or unable to determine the altitude for any reason, the altimeter 236 can be used to determine the altitude of the diagnostic tool 100. The altimeter 236 is electronically coupled to the processor 202 and can provide the altitude or elevation of the diagnostic tool. The altimeter can be coupled to a barometric pressure sensor (not shown) in order to calibrate the elevation measurements determined by the altimeter. The sensor can be positioned interior or exterior to the housing of the diagnostic tool. Minor atmospheric pressure changes can affect the accuracy of the altimeter, thus, diagnostic tool can correct for these changes by using the sensor in conjunction with the altimeter along with a correction factor.

Wireless communication circuit 238 communicates with the processor via second bus system 222. The wireless communication circuit can be configured to communicate to RF (radio frequency), satellites, cellular phones (analog or digital), Bluetooth®, Wi-Fi, Infrared, Zigby, Local Area Networks (LAN), WLAN (Wireless Local Area Network), or other wireless communication configurations and standards. The wireless communication circuit allows the diagnostic tool to communicate with other devices wirelessly. The wireless communication circuit includes an antenna built therein and being housed within the housing or can be externally located on the housing.

A scan tool program is needed to operate the scan tool to perform the various diagnostic tests. Different vehicle manufactures (or even within the same manufacture) require the scan tool to operate using different programs and communication protocols. The scan tool may determine whether it is operating the correct software or program for a particular vehicle by comparing the vehicle type with the program currently running on the scan tool. The vehicle type may be inputted into the scan tool through the user interface 106 in a manner such as, for example, scanning a bar coded VIN number located on the vehicle to be serviced. From the vehicle information, the scan tool can then determine whether it is presently running the necessary program to service the vehicle.

The size of the scan tool program determines the amount of data resident on the scan tool, which in turn determines the amount of memory needed to be incorporated into the scan tool. Because computer memory is an expensive component in the manufacture of the scan tool, reducing the amount of memory needed by the scan tool reduces the overall cost of the scan tool. In order to reduce the amount of memory needed, the program related to specific vehicles is resident in the memory 208 and/or NVM 218 of the scan tool at any one time. When the scan tool determines that it is not running the necessary program to service the vehicle, the scan tool must be updated with the program appropriate for the vehicle to be serviced. In order to obtain this different program, the scan tool must connect to a remote computing device (not shown), such as a personal computer, a laptop, a server or other computer with either a collection of programs resident thereon. Alternatively, the remote computing device has the ability to access programs stored on another remote computing device connected to the internet, and then requests the required program.

In operation, the scan tool will utilize the wireless communication circuit 238 to communicate with the remote computing device to obtain the required scan tool program and then flashes or erases the current scan tool program. The program is sent by the remote computing device, and received by the wireless communication circuit 238. The program is then transmitted via the bus 222 to the DRAM that is part of the memory subsystem 208. Once the program is stored in the DRAM, the program runs to reprogram the ROM, which is also part of the memory subsystem 208 and/or part of NVM 218. Once the ROM has been reprogrammed, the scan tool is able to service the vehicle.

By allowing the scan tool to store only the program required for the vehicle under test, the scan tool does not need to have much memory. The savings on memory allows a scan tool manufacturer to provide a lower cost scan tool to an end user. Additionally, by having one program being loaded on the scan tool at a time will decrease compatibility issues that occur when multiple programs are on the scan tool.

Figure 3:
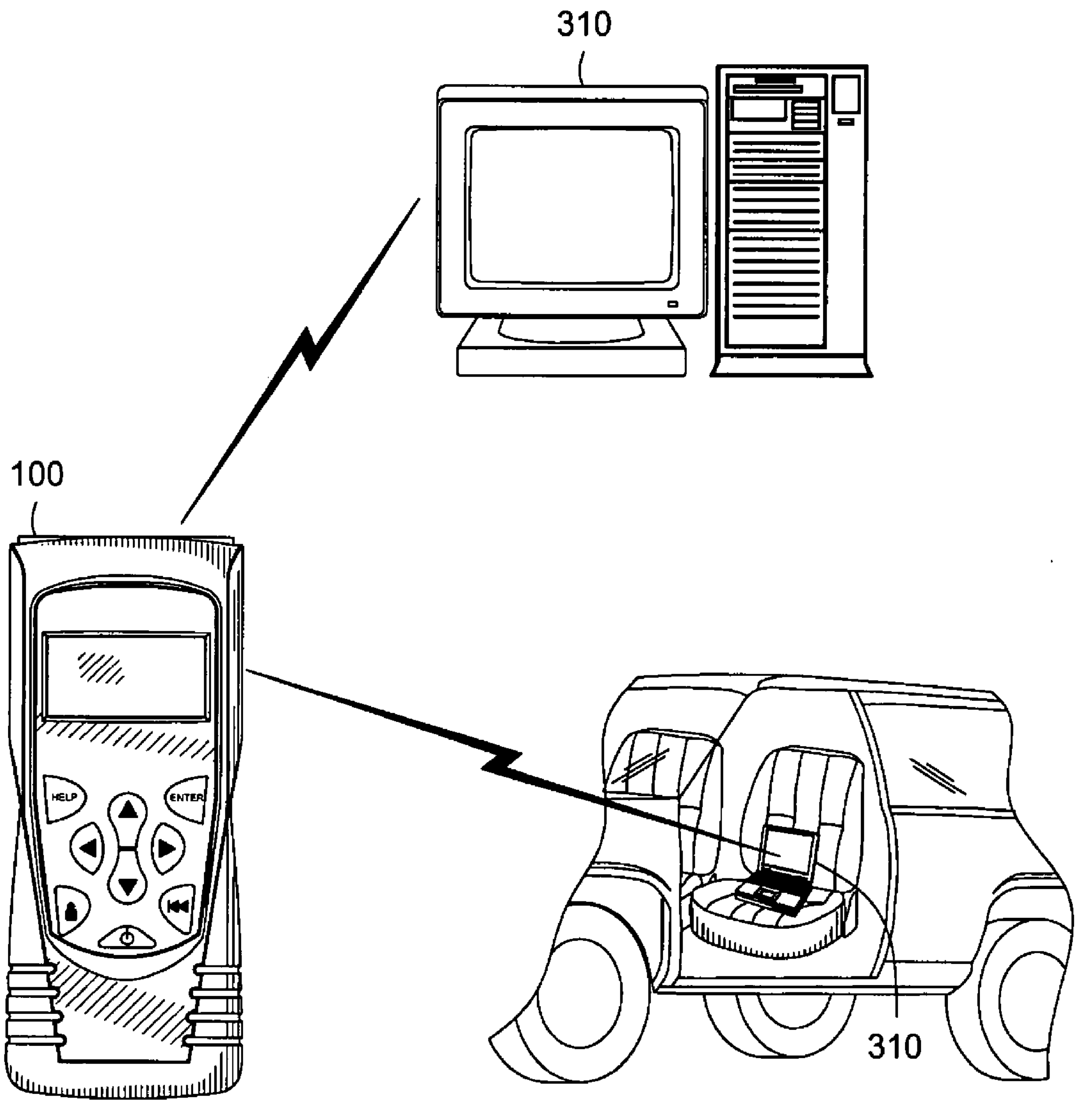
FIG. 3. illustrates a diagnostic tool wirelessly communicating with a remote computer.

FIG. 3. illustrates the diagnostic tool wirelessly communicating with a remote computer. The diagnostic tool 100 communicates with the remote computing device 310. In one embodiment, the diagnostic tool can be used in and around a service station, while communicating with a remote computing device located inside the service station to obtain the proper diagnostic tool program. In another embodiment, the diagnostic tool can be used to communicate with a remote computer by wirelessly accessing the internet to obtain the proper diagnostic tool program.

In still another embodiment, the diagnostic tool can be used in and around a tow-truck or other service vehicle that is responding to a call away from the service station. In this embodiment, the diagnostic tool would communicate with a remote computing device located inside or near the tow-truck or other service vehicle to obtain the proper diagnostic software.

The above described method is done in the tool via software, however, hardware or hardware and software combination to carry out the method is also contemplated. All the steps described here do not have to be performed in order, variations of the order of the steps are also contemplated.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:

a processor;

a memory that stores a first diagnostic software that operates the processor to perform a diagnostic function;

a connector interface that connects the diagnostic tool to a data link connector in the vehicle;

a signal translator that allows the diagnostic tool to communicate with the vehicle in at least one communication protocol;

a wireless communication circuit that communicates with a remote computing device to retrieve a second diagnostic software that is different from the first diagnostic software;

a housing surrounding the processor, the memory, the connector interface, the signal translator, and the wireless communication circuit a global positioning system receiver coupled to the processor and housed within the housing; and an altimeter coupled to the processor, wherein the altimeter provides an altitude information of the diagnostic tool.

2. The diagnostic code of claim 1, wherein the second diagnostic software communicates and retrieves diagnostic data from the vehicle when the first diagnostic software can not.

3. The diagnostic tool of claim 1, wherein the remote computing device is selected from a group consisting of a personal computer, a laptop, a server, and a computer located on the internet.

4. The diagnostic tool of claim 1, wherein the remote computing device contains diagnostic software for at least two vehicle manufacturer.

5. The diagnostic tool of claim 1, wherein the second diagnostic software received by the wireless communication circuit is saved in a random access memory.

6. The diagnostic tool of claim 5, wherein the second diagnostic software saved in the random access memory is operated to reprogram a read only memory and removes the first diagnostic software from the diagnostic tool so that a user can service the vehicle.

7. A method of operating a diagnostic tool for a vehicle, comprising:

connecting the diagnostic tool to the vehicle;

determining whether a first diagnostic software operating on the diagnostic tool is appropriate for the vehicle;

communicating wirelessly with a remote computing device to obtain a second diagnostic software if the first diagnostic software is determined to be inappropriate;

retrieving the second diagnostic software from the remote computing device;

storing the second diagnostic software in the diagnostic tool;

operating the second diagnostic software to diagnose the vehicle; and providing location information via a global positioning system and an altimeter.

8. The method of claim 7, wherein the second diagnostic software is stored in a random access memory.

9. The method of claim 7, wherein the second diagnostic software reprograms a read only memory on the diagnostic tool and removes the first diagnostic software from the diagnostic tool.

10. The method of claim 7, further comprising displaying diagnostic information to a user on a display of the diagnostic tool.

11. The method of claim 7, wherein the first diagnostic software is inappropriate when it can not be used to obtain diagnostic information from the vehicle.

12. The method of claim 7 further comprising inputting identification information for the vehicle into the diagnostic tool in order for the diagnostic tool to determine if the first diagnostic software is appropriate for the vehicle.

13. A diagnostic tool for a vehicle, comprising:

means for processing that is operated by a software program;

means for storing that stores a first software that operates the means for processing to perform a diagnostic function;

means for connecting that connects the diagnostic tool to a data link connector in the vehicle;

means for translating that allows the diagnostic tool to communicate with the vehicle in at least one communication protocol;

means for wirelessly communicating that communicates with a remote computing device to retrieve a second diagnostic software that is different from the first diagnostic software;

means for housing surrounding the means for processing, the means for storing, the means for connecting, the means for translating, and the means for wirelessly communicating;

means for determining a global position coupled to the means for processing and housed within the means for housing; and an altimeter coupled to the means for processing, wherein the altimeter provides an altitude information of the diagnostic tool.

14. The diagnostic tool of claim 13, wherein the second diagnostic software communicates and retrieves diagnostic data from the vehicle when the first diagnostic software can not.

15. The diagnostic tool of claim 14, wherein the second diagnostic software received by the means for wirelessly communicating is saved in the means for storing.

16. The diagnostic tool of claim 15, wherein the second diagnostic software saved in the means for storing is operated to reprogram a read only memory and removes the first diagnostic software from the diagnostic tool.

* * * * *